United States Patent [19]

Weeks

[11] Patent Number: 4,630,430

[45] Date of Patent: Dec. 23, 1986

[54] CORN HEAD ASSEMBLY FOR HARVESTING CORN

[76] Inventor: Harry D. Weeks, 7225 Kile Rd., Plain City, Ohio 43064

[21] Appl. No.: 721,684

[22] Filed: Apr. 10, 1985

[51] Int. Cl.$^4$ ............................................. A01D 45/02
[52] U.S. Cl. ...................................... 56/14.1; 56/105; 56/119
[58] Field of Search ................. 56/14.1, 98, 103, 104, 56/105, 106, 107, 108, 119

[56] References Cited

U.S. PATENT DOCUMENTS

| | | | |
|---|---|---|---|
| 2,604,750 | 7/1952 | Fergason | 56/104 |
| 2,946,170 | 7/1960 | Anderson | 56/104 |
| 3,088,261 | 5/1963 | Lagouarde | 56/14.1 |

FOREIGN PATENT DOCUMENTS 0501702  2/1976  U.S.S.R. ................................. 56/106

Primary Examiner—Gene Mancene
Assistant Examiner—David I. Tarnoff
Attorney, Agent, or Firm—Francis T. Kremblas, Jr.

[57] ABSTRACT

An improved corn head assembly for corn picking apparatus which is provided with a plurality of forward guides forming a plurality of laterally spaced openings adapted to receive a planted corn stalk as the apparatus is driven along the length of planted rows of corn. A corn stalk distributing member is provided at the rearward portion of each of the openings to engage and deflect the corn stalks entering one of the openings laterally into engagement with a pair of ear removing rotating snapping rolls associated with stripping plates. The axis of rotation of said rolls is disposed generally laterally to the direction of travel of said apparatus. The corn ears removed by the snapping rolls and stripping plates tend to be thrown upwardly and rearwardly toward conventional collection apparatus mounted to the rear of the corn head assembly.

4 Claims, 6 Drawing Figures

CORN HEAD ASSEMBLY FOR HARVESTING CORN

BACKGROUND

Present corn picking apparatus, which is typically mounted on the forward end of a conventional combine, has traditionally comprised what is referred to as a corn head assembly. This assembly included a plurality of corn stalk openings formed by lateral spaced snout-like guides which tend to guide the corn stalks toward the picking or corn ear separating means disposed at or near the end of the corn stalk openings.

The picking or separating means have conventionally comprised a pair of relatively long conical rotating finned snapping rolls closely spaced adjacent to one another and aligned with the axis of rotation parallel to the direction of travel of the apparatus. A longitudinal slot formed in a stripper plate mounted on the assembly frame is disposed above the snapping rolls.

To aid the desired relative movement of the corn stalk, an endless chain is mounted along one or both sides of the corn stalk receiving opening and included a plurality of inwardly directed lugs. The endless chain assembly was driven in the opposing direction to the direction of travel and functioned as an aid to direct the corn stalks aligned with each opening to the ear picking portion of the apparatus with the lugs on the chain striking or engaging the corn stalk. The endless chains are located along the corn-receiving openings between the snout-like guides at a descending angle and terminate at or even slightly forward of the openings. This construction tended to somewhat aid the ability of the corn head assembly to engage bent over stalks which otherwise might be missed entirely in the harvesting process. The chain also engages the separated ears to push them rearwardly toward the collecting auger.

This basic construction has been used for many years in the farming industry with no significant change. However, such a construction presents several disadvantages and problems which, until the present invention, have not been satisfactorily solved.

One of the problems of the prior conventional corn head construction is the tendency to lose yield by either losing ears which are picked or losing kernels from the ears during the picking thereof. Another problem associated with this prior construction is the limiting effect on the speed which the apparatus can functionally and efficiently operate in the field to pick the ears from the stalk.

The present commercial construction wherein the endless chain and the associated stripping plates are mounted at a descending angle in the direction of travel tends to cause a percentage of corn ears to fall forwardly upon separation from the stalk instead of traveling rearwardly into the collecting means. In addition, the location of the stripping plate opening through which the stalk is pulled downwardly by the snapping rolls, causes a percentage of corn ears to be partially engaged by the rotating snapping rolls. This engagement tends to remove a portion of the kernels from the ear, which kernels fall to the ground and hence are unharvested.

The limit of the speed of forward travel tends to be diminished by the endless chain construction wherein the speed of movement of the chain must not be so fast that the lugs on the chain tend to tear or break the corn stalk apart prior to its entrance into the opening or slot of the stripping plates and engagement by the snapping rolls. Obviously, if too many stalks are prematurely torn or broken in this manner, the harvesting operation becomes less and less efficient. Typically operational speed of the combine and picking apparatus is between 3 to 5 miles per hour with most users operating between 3 and 4 miles per hour for efficient operation with minimum losses.

Losses from the above discussed causes are increasingly important as the farmer has been forced to seek greater and greater efficiency to maintain a profitable operation in the face of other rising costs. The present invention is directed to a novel corn head assembly which significantly improves the efficiency of the harvesting process by reducing loss, permitting greater speed of picking process, and simplifying the overall construction of the corn head assembly.

SUMMARY OF INVENTION

The present invention is related to corn harvesting apparatus and particularly to an improved corn head assembly. In one aspect of the present invention, the forward snout-like guides are configured in a different manner to increase their ability to lift and guide broken or laid over stalks into the ear separating portion.

In another apsect of the present invention, a new construction and arrangement is employed wherein the snapping rolls and stripper plates are disposed at generally right angles to the direction of travel. In cooperation with novel stalk distributing or deflecting means and the snout guides, the corn stalk is moved relatively rearward and then laterally of the direction of travel during the separation of the corn ear from the stalk.

The novel stalk distributing means, preferably comprises a rotating disk-like structure disposed at the rearward end of the stalk receiving opening between the snout guides. It also includes a shallow spiral projection or rib which has an auger like action for directing the stalk laterally between the opening of the stripper plates and into engagement with the snapping rolls disposed adjacent thereto. This arrangement eliminates any need for the prior conventional endless chain and dramatically reduces loss of the kernels from the ears separated from the stalk.

In a further respect, the above described arrangement lends itself to a more favorable disposition of both the stripper plates and the snapping rolls to substantially assure the picked ears cannot fall forwardly from the apparatus to be lost. The rearwardly imparted force of the movement of the apparatus during harvesting is supplemented to cause the ear to be moved toward the conventional auger collection portion in a more positive manner.

The construction of the present invention also tends to permit the apparatus to be driven faster during the picking operation, as much as 6 to 10 miles per hour, with no significant loss of picking efficiency and subsequent decrease in effective yield.

OBJECTS

It is a primary object of the present invention to provide a novel and improved corn head assembly for harvesting corn which improves harvest yield efficiency by reducing the occasion of loss of both kernels from a picked ear as well as loss of the whole ear during the picking process.

It is another object of the present invention to provide an apparatus of the type described which permits harvesting at greater speeds than prior apparatus without increasing harvest yield losses such as encountered using prior apparatus.

It is a further object of the present invention to provide an apparatus of the type described wherein the corn head includes a novel arrangement of the stripping plates and the snapping rolls wherein the corn ear is separated from the stalk in a manner which substantially eliminates any tendency for the ear to fall forward away from the collecting means associated therewith.

It is still another object of the present invention to provide an apparatus of the type described wherein a preferred embodiment of a distributing and deflector means is incorporated which tends to distribute portions of corn stalks of a single row in opposing lateral directions into separate ear removal portions which tends to enhance faster harvesting speeds without clogging the ear removal apparatus.

It is yet another object of the present invention to provide an apparatus of the type described which provides the advantages referred to herein and yet represents an improved more compact design compared to prior art constructions.

Further objects and advantages of the present invention will be apparent from the following description, reference being had to the accompanying drawings wherein a preferred form of embodiment of the invention is clearly shown.

IN THE DRAWINGS

DETAILED DESCRIPTION

Figure 1:
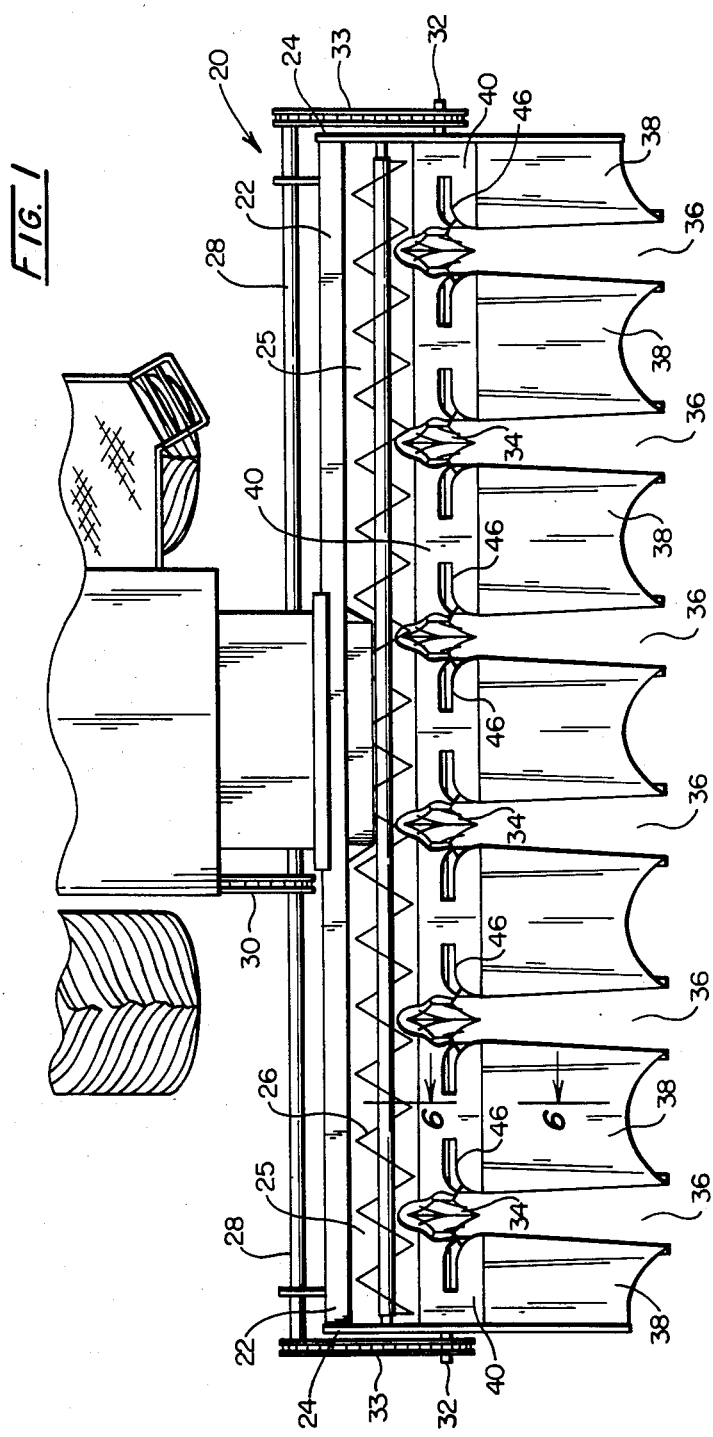
FIG. 1 is a top plan view of a corn head assembly mounted to the forward end of a conventional combine and constructed in accordance with the present invention.
Figure 2:
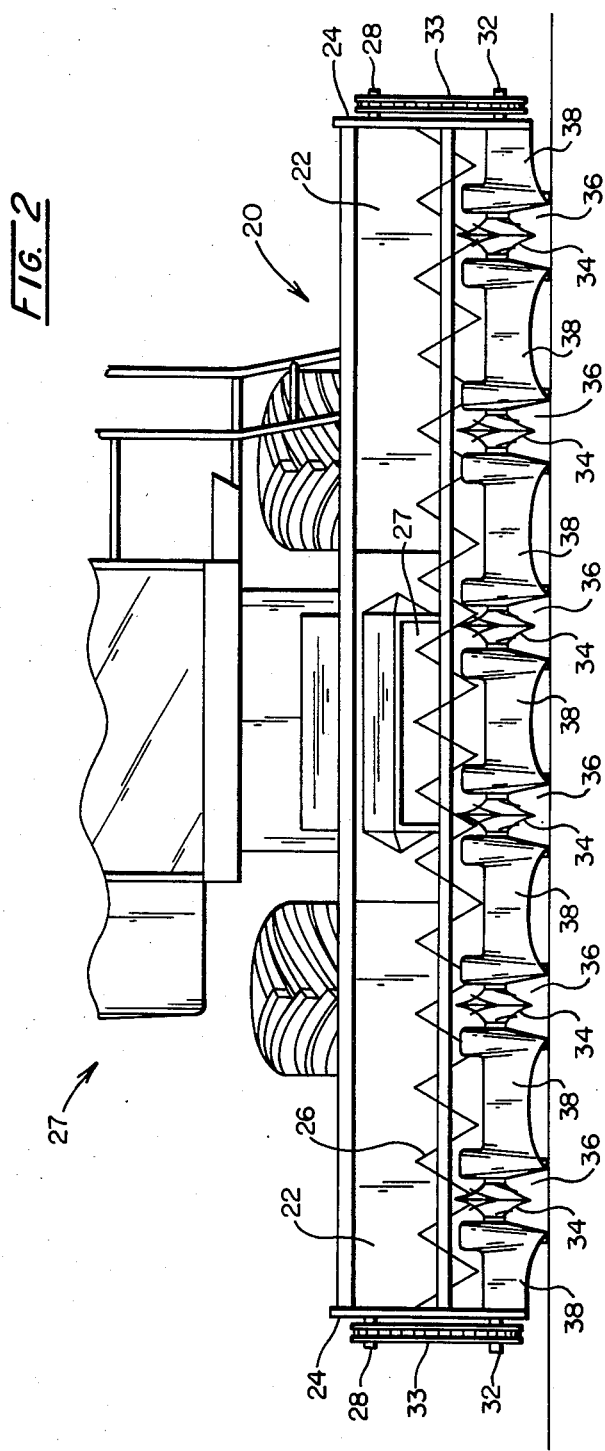
FIG. 2 is a front elevational view of the apparatus shown in FIG. 1.

An improved corn head assembly constructed in accordance with the present invention is shown in FIGS. 1 and 2 and includes a supporting frame means, indicated generally at 20. Frame means 20 includes a rear support panel 22, side panels 24 and a floor or bottom panel 25. The frame means is mounted to the forward end of a conventional self-propelled combine indicated generally at 27 in a conventional manner, not shown, as the mounting of the novel corn head assembly to the propelling and shelling equipment by itself, is conventional and forms no part of the present invention.

Also included in the corn head assembly of the present invention is a conventional auger represented at 26 which is rotatably driven in the same manner and located in the corn head frame in the same well-known manner as in prior appartus. Auger 26 functions to collect the ears separated from the stalks and carries them to the conventional central collecting area 29 for transport to the shelling apparatus in the combine.

A driven shaft 28 is conventionally provided which is operatively connected to a driven chain assembly, such as at 30, provided on the combine.

With continued reference to FIGS. 1 and 2, the novel improvements of the corn head assembly principally involve the provision of a laterally extending shaft means 32 rotatably mounted to side panels 24. Shaft means 32 is operatively connected to drive shaft 28 via a conventional endless chain and sprocket assembly 33.

A plurality of novel, disk-like corn stalk distributing members 34 are fixed to shaft 32 at laterally spaced locations near the rear of a respective one of a plurality of stalk receiving openings indicated generally at 36. Openings 36 are defined by a plurality of snout-like guide means 38 which may be fixedly mounted in any conventional manner to the leading end of a plurality of stripping plate means 40. Plate means 40, in turn, are conventionally fixed to floor panel 25 of the frame means 20 such as by bolts 47, FIG. 6.

Figure 6:
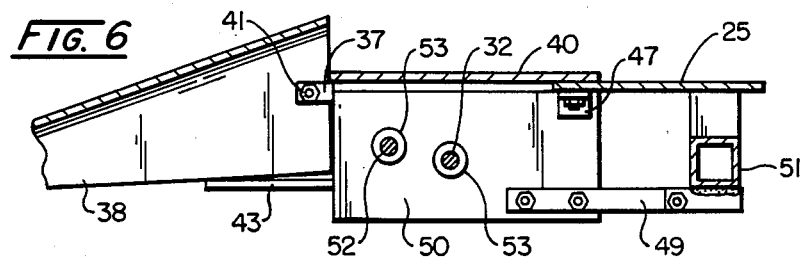
FIG. 6 is a side sectional view of a portion of the apparatus shown in FIG. 1, the section being taken along line 6—6 in FIG. 1.

With reference to FIG. 6, preferably, each guide means 38 is pivotably mounted near the rearward end to an arm 37 by a pin means 41. A limiting plate 43 fixed to the side walls of a gear compartment, described later herein, extends outwardly below each guide member 38 to fix the normal downward extent of pivoting of the member 38. In this manner, if a large rock or the like passes under a member 28 during operation, the guide member 38 is free to pivot upwardly to reduce damage to the member 38 when such an impediment is encountered.

Stripping plates 40 comprise a plurality of metal plate sections extending forwardly of the floor or bottom panel 25 to a position overlying a pair of snapping rolls 42 and 44.

Plates 40 are provided with a stripping slot 46 which is aligned with a vertical plane extending between the snapping rools 42, 44 and extends longitudinally at approximately a right angle to the normal direction of travel of the apparatus during harvesting of the corn. Slot 46 includes an open end facing distributing member 34 and is aligned to receive a corn stalk deflected laterally by member 34.

The portion of each plate 40 rearward of slot 46 is disposed in a generally horizontal plane relative to the ground upon which the apparatus rests and the generally same elevation as floor 25. The portion of plate 40 disposed forwardly of the slot 46 preferably is horizontal or even inclined upwardly.

Figure 3:
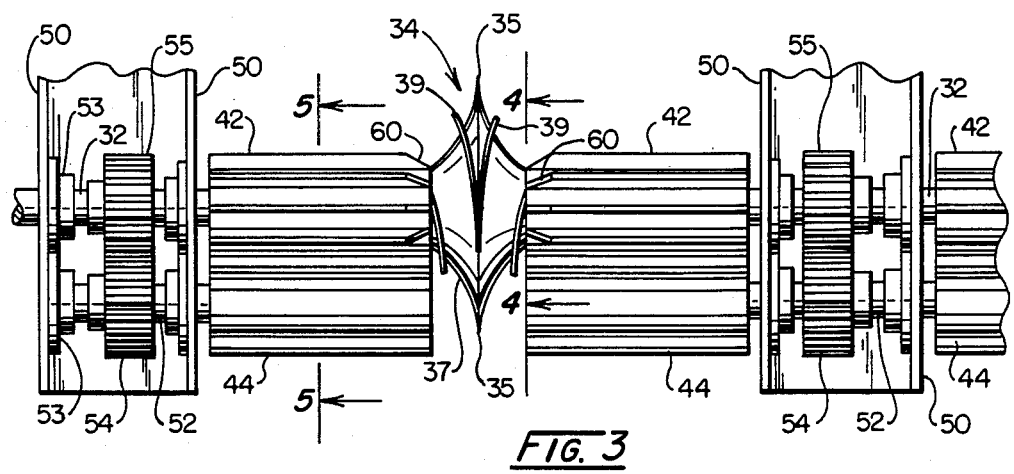
FIG. 3 is a top plan of a portion of the apparatus shown in FIG. 1 illustrating the snapping rolls and corn stalk distributing means.
Figure 4:
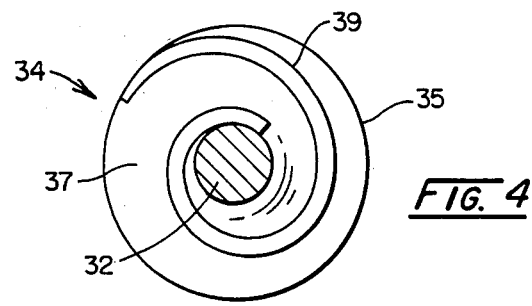
FIG. 4 is a side sectional elevational view of the portion of the apparatus shown in FIG. 3, the section being taken along line 4—4 in FIG. 3.
Figure 5:
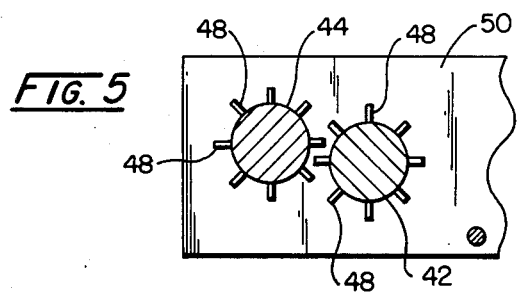
FIG. 5 is a side sectional view of the portion of the apparatus shown in FIG. 3, the section being taken along line 5—5 in FIG. 3.

As best seen in FIGS. 3, 4 and 5, snapping rolls 42 and 44 are similar in construction to conventional snapping rolls except that they comprise generally cylindrical bodies provided with a plurality of radially extending fins 48 instead of the conical configuration typically used in present conventional corn heads.

As viewed in FIG. 3, snapping roll 42 is mounted on shaft 32 and is disposed rearwardly and at a slightly lower elevation than the more forwardly disposed roll 44.

A protective gearing compartment is provided and comprises side support plates 50 which are mounted in any conventional manner to floor 25 and to support beam 51 of the frame means 20 via support arm 49 as seen in FIG. 6.

A stub shaft 52 is rotatably mounted in a bearing member 53 conventionally mounted to support plates 50. Shaft 52 extends outwardly of the left plate 50 as viewed in FIG. 3 and receives roll 44 which is fixed to shaft 52. A gear arrangement comprising a gear 54 fixed to shaft 52 which mates with a gear 55 mounted on driven shaft 32 effects rotation of stub shaft 52 and roll 44 in an opposite direction to the rotation of shaft 32 and roll 42. Similar to conventional snapping rolls, a corn stalk directed between the fins 48 of rolls 42 and 44 will be drawn downwardly between the rotating rolls. With the slot 46 of stripper plates located above the rolls 42, 44, a stalk directed into slot 46 will be drawn downwardly through slot 46.

Since the width of slot 46 is smaller than the corn ear, the ear cannot pass through the slot and is forced or torn off the stalk. The separated ear is thrown upwardly and rearwardly by this action into the path of auger 26 as the remainder of the stalk is pulled downwardly between the rolls 42 and 44.

Quite different as compared to the prior art construction wherein the axis of the snapping rools are parallel to the normal direction of travel, the corn stalks are directed into the laterally aligned slot 46 of stripping plates 40 and between snapping rolls 42 and 44 which have their axis of rotation at right angles to the direction of travel.

The distributing means or disk-like member 34 is rotated in the same manner as roll 42 as it is mounted on rotating shaft 32. It also represents a significant departure from the construction of prior apparatus. Member 34 is provided with a relatively narrow or sharp outer edge 35 and is flared outwardly toward its center. Each half of member 34 is a generally conical configuration and provides a surface 37 which curves outwardly from the leading edge toward the center portion through which shaft 52 extends. In addition, each flared surface 37 of member 34 is provided with a relatively shallow upraised projection or rib 39 disposed in a spiral configuration as best seen in FIG. 4. This may be formed by a length of metal tubing or flat bar stock, for example, which is welded or otherwise fixed to the flared or curved surfaces 37 as seen in FIGS. 3 and 4.

The upraised spiral surface formed on member 34 in cooperation with the curved surface 37 and the rotation thereof has an auger-like effect and very effectively guides a corn stalk entering opening 36 rearwardly and laterally toward the open end of slot 46 and between snapping rolls 42 and 44. Between the forward motion of the apparatus and the lateral impetus imparted by disk-like distributing member 34, the corn stalk is forced rearwardly and laterally to the rear of opening 36 and into slot 46 and between snapping rolls 42, 44. Once the stalk engages the fins 48 of the snapping rolls, it is rapidly drawn downwardly through the rolls and through slot 46. The corn ear on the stalk cannot pass through slot 46 and is pulled off and simultaneously directed onto floor 25 and into engagement with auger 26.

Preferably, spiral rib 39 is relatively shallow, no greater than one-half inch or so, so as not to impart any excessively violent tearing action upon engagement with a corn stalk even at relatively high rates of rotation of member 34.

The shallow configuration is relatively gentle on the corn stalk and yet is more than sufficient to assure the stalk is guided along the desired lateral path into slot 46 and between the snapping rolls 42 and 44.

Preferably, the inner ends of fins 48 include a relatively short tapered portion, such as 60, on at least one of the rolls 42 or 44. This provides a slightly greater opening between the snapping rolls at the point of entrance of the stalk to allow the stalk to travel slightly farther in between the rolls prior to being pinched or grabbed between the fins 48 of each roll 42 and 44. This eliminates the chance that a stalk may be broken by engagement with the fins prior to being pulled downwardly between the rolls 42, 44.

Under normal and typical field conditions, a natural sway and minor steering departure from an absolutely straight course through the field occurs. In view of the narrow leading edge of member 34, a given corn stalk entering an opening 36 is as likely to be directed to the right side of member 34 as it is to the left side thereof and into the associated stripping slot 46 and snapping rolls 42, 44 disposed on either side of member 34. In this manner, a natural but random division of the stalks in a single row occurs during harvesting.

This division of the stalks of any single row into separate ear removal apparatus eliminates, or at least drammatically reduces, the possibility of any given pair of snapping rolls or their associated stripping slot to become clogged upon increasing the forward speed of the apparatus.

Therefore increasing the speed of rotation of member 34 may be used to coordinate with increased ground speed to harvest the corn in a faster manner as compared to prior machines without increasing the premature loss of corn stalks still bearing the corn ear prior to its reaching the snapping rolls and the stripping slot.

A further advantage provided by the construction of the present invention relates to the configuration and location of the stripping plates 40, and slot 46 and the snapping rolls 42, 44. As earlier described, the rearward portion of stripping plates 46 are generally horizontally disposed and essentially level with floor 25 while the forward portion is level or maybe inclined upwardly relative to the direction of travel. As a corn ear is separated, this configuration in combination with the forward ground speed of the apparatus and the higher disposition of the forward most snapping rolls 44, essentially assures that the separated ear will be thrown rearwardly into engagement with the auger 26 for proper collection. It should be pointed out that by disposing the forward most snapping roll 44 at a slightly higher elevation than its mating roll 42, a stalk being pulled between the rolls tends to be inclined in a rearwardly manner. This provides a supplementary rearward impetus to the separated corn ear.

When compared to the prior conventional configuration wherein the stripper plates are inclined downwardly relative to the direction of travel and reliance is placed upon the endless chain and lug feature previously described to prevent separated ears from falling away from the collecting auger, it should be readily apparent to those skilled in the art that the loss of separated ears which are not engaged by the auger 26 is drammatically reduced or eliminated in accordance with the present invention. Of course, a further advantage is the lug and chain construction is rendered unnecessary and therefore is eliminated completely.

In view of the foregoing description, it should be apparent that the corn head assembly of the present invention represents a significant departure from the prior art in construction and operation. Further it provides for improving productive capacity and harvesting yield by eliminating or significantly reduces occasions for loss of the corn while permitting increased harvesting speed.

What is claimed is:

1. In a corn head assembly for mounting on the forward end of a conventional self-propelled combine and shelling apparatus; the combination of a frame means supporting a corn ear collecting means; a plurality of forward extending guide members laterally spaced from one another relative to the normal direction of travel to define a plurality of corn stalk-receiving openings; a corn stalk distributing means disposed at or near the rearward end of each of said corn stalk-receiving openings and including a rotatably mounted disk-like member provided with a vertially disposed knife-like outer edge and pair of curved surfaces extending laterally in opposing directions from said outer edge for engaging and imparting lateral movement to a corn stalk passing through said corn stalk-receiving openings; a stripping plate means disposed adjacent to each side of distributing means and including a longitudinal slot means having an open end facing said distributing means and aligned to receive a corn stalk laterally directed by said distributing means and having a width insufficient to permit a corn ear from passing through said slot means, and a pair of closely spaced, snapping rolls rotatably driven in opposing directions relative to one another and mounted on said frame means below a respective one of said slot means and adjacent to a respective one of said distributing means to engagably receive a corn stalk directed by said distributing means between said rolls and force said stalk downwardly through said slot means; the axis of rotation of said rolls being generally parallel to the longitudinal extent of said slot means and disposed at generally a right angle to the normal direction of travel of said apparatus.

2. An improved corn head assembly mounted on the forward end of a conventional combine for harvesting corn, the improvement comprising, in combination, a supporting frame means; a plurality of forwardly extended laterally spaced guide means mounted on said frame means and defining a plurality of stalk receiving openings between said guide means; a corn stalk distributing means rotatably mounted to said frame means near the rearward portion of each of said stalk receiving openings and including a pair of opposing lateral extending surfaces centrally joined to form a vertically disposed annular knife-edge for deflecting and guiding a corn stalk engaged by said distributing means in a rearward and lateral direction relative to the normal direction of travel; stripping plate means having a generally horizontally extending surface provided with a stripping slot extending generally perpendicular to the normal direction of travel and mounted to said frame means adjacent to each of said lateral extending surfaces of said distributing means; and a pair of rotatable snapping rolls mounted closely adjacent to each side of said distributing means and aligned below a respective one of said stripping slots to receive and engage a corn stalk moved laterally by a respective one of said laterally extending surfaces of said distributing means in between said snapping rolls to pull said stalk downwardly through said stripping slot thereby separating a corn ear from said corn stalk.

3. The apparatus defined in claim 2 wherein each of the opposing lateral surfaces of said corn stalk distributing means are provided with an upraised rib portion defining a spiral configuration for rearward and lateral deflection of a corn stalk engaging said laterally extending surface to force said stalk into a position between said snapping rolls.

4. The apparatus defined in claim 1 wherein the forward most disposed roll comprising one of said pair of snapping rolls is disposed in a plane extending vertically higher than the other snapping roll of said pair.

* * * * *